United States Patent [19]

Holleman et al.

[11] Patent Number: 5,721,749
[45] Date of Patent: Feb. 24, 1998

[54] LASER PULSE PROFILE CONTROL BY MODULATING RELAXATION OSCILLATIONS

[75] Inventors: Gerald W. Holleman, Manhattan Beach; Hagop Injeyan, Glendale, both of Calif.

[73] Assignee: TRW Inc., Redondo Beach, Calif.

[21] Appl. No.: 593,961

[22] Filed: Jan. 30, 1996

[51] Int. Cl.$^6$ .................................................. H01S 3/10
[52] U.S. Cl. ................................. 372/13; 372/25; 372/75
[58] Field of Search ................................ 372/13, 25, 75

[56] References Cited

U.S. PATENT DOCUMENTS

| | | | |
|---|---|---|---|
| 3,611,187 | 10/1971 | Osterlink et al. | 331/94.5 |
| 3,633,124 | 1/1972 | Danielmeyer | 331/94.5 |
| 4,057,770 | 11/1977 | Henningsen et al. | 331/94.5 |
| 4,079,339 | 3/1978 | Kobayashi et al. | 331/94.5 |
| 4,297,651 | 10/1981 | Dyment et al. | 331/94.5 H |
| 4,325,034 | 4/1982 | Dyment et al. | 372/50 |
| 4,736,378 | 4/1988 | Myslinski | 372/18 |
| 4,959,838 | 9/1990 | Barnes | 372/25 |
| 5,173,910 | 12/1992 | Pocholle et al. | 372/22 |
| 5,214,666 | 5/1993 | Watanabe et al. | 372/69 |
| 5,390,204 | 2/1995 | Yessik et al. | 372/38 |
| 5,555,254 | 9/1996 | Injeyan et al. | 372/33 |

*Primary Examiner*—James W. Davie
*Attorney, Agent, or Firm*—Michael S. Yatsko

[57] ABSTRACT

A method and apparatus for controlling the form and timing of pulses emitted by a high-power solid-state laser, without the need for complex feedback circuits. The width and peak intensity of relaxation pulses emitted by the laser are controlled by use of an acousto-optic modulator (14) installed in the laser cavity, to lock the relaxation pulses to the frequency of radio-frequency (rf) control signals applied to the modulator. The number and average rate at which the pulses are emitted from the laser are independently controlled by varying the duty cycle of diodes (20) used to pump solid-state amplifiers (18) installed in the laser cavity. Short pump pulses can be selected to deliver only a few relaxation pulses from the laser, or longer pump pulses can be selected to deliver large numbers of relaxation pulses during each pump pulse. Feedback control of the modulator (14) is not needed because the pumping rate is uniform for the duration of each pump pulse and, therefore, the peak intensities of relaxation pulses emitted by the laser are relatively uniform. Accordingly, the solid-state laser can be conveniently controlled to produce a desired average power output while maintaining good beam quality.

8 Claims, 2 Drawing Sheets

LASER PULSE PROFILE CONTROL BY MODULATING RELAXATION OSCILLATIONS

BACKGROUND OF THE INVENTION

This invention relates generally to high-power solid-state lasers and, more particularly, to lasers of this general type used for machining or material processing applications. High-power solid-state lasers are typically used in a pulsed mode of operation for machining applications, such as cutting and drilling. Ideally lasers used for this purpose should have intermediate pulse lengths and variable pulse formats. When lasers are operated in a pulsed mode by means of conventional Q-switching, the pulse length obtained is approximately 5–20 ns (nanoseconds), which is too short for most machining operations, and the pulses usually have a peak intensity that is too high for machining use. On the other hand, free running, long pulse length lasers produce pulses with insufficient intensity for cutting and drilling applications. For these applications, the ideal pulse length is in the intermediate range of 100 ns to 300 ns.

Some types of lasers, such as solid-state lasers, produce pulses at a natural relaxation oscillation frequency when subjected to a short burst of pump energy. Various configurations have been proposed to provide control of the width, peak intensity, and spacing of laser relaxation output pulses. Control can be effected either by modulating the laser itself or by controlling laser pumping, which inputs energy to the laser cavity. Intracavity laser modulation usually requires the selective insertion of losses in the cavity to suppress lasing. A conventional Q-switch, for example, operates periodically to suppress lasing completely while the device continues to be pumped, and then suddenly removes the inserted loss and switches the laser on, which allows a large pulse to be emitted by the laser. Control of laser output by controlling the duration and timing of pumping energy also affords a degree of control of the output pulse waveform. For solid-state lasers, which produce output pulses at the natural relaxation oscillation frequency, control of the pumping duty cycle results in "macropulses" of laser output, each of which contains subpulses of rapidly decreasing intensity at the natural relaxation oscillation frequency. Solid-state lasers of the prior art have typically been pumped by flash lamps, which, when pulsed, provide pumping energy that varies widely in intensity, building up to peak and then dropping off toward the end of the pump pulse. The subpulses contained within this pumping macropulse have a corresponding variation in peak intensity and are, therefore, unsuitable for machine tool applications.

Various prior art patents, such as U.S. Pat. Nos. 3,747,019 and 4,959,838, have disclosed relatively complex techniques for modulating the laser output to achieve a more desirably uniform sequence of output pulses. These techniques require some form of control system wherein the output beam is monitored and used to feed back a modulator control signal. Basically, the feedback control systems are needed because variations in the laser pump rate require commensurate variations in the modulation rate to maintain stable operation and produce the desired output pulse characteristics.

It will be appreciated, however, that there is still a significant need for improvement in the field of high-power lasers suitable for industrial use in drilling and machining applications. The present invention satisfies this need.

SUMMARY OF THE INVENTION

The present invention resides in a high-power solid-state laser that is especially suitable for material processing applications. Briefly, and in general terms, the laser comprises a laser cavity defined by two reflectors, at least one solid-state amplifier or gain generator disposed in the laser cavity, at least one array of diodes located adjacent to the at least one amplifier, for pumping the laser during pump macropulses in accordance with a selected duty cycle, an acousto-optic (AO) modulator disposed in the laser cavity, a signal source of radio-frequency (rf) coupled to the AO modulator to produce a series of laser output pulses of constant pulse width and height during each pump macropulse, and a control circuit for switching the pump diodes on and off in a series of macropulses of preselected duration and frequency. The duration and frequency of the pumping macropulses determine the number and total energy of pulses emitted from the laser, without the need for feedback control of the modulator.

In terms of a novel method, the invention comprises the steps of applying laser pumping energy to at least one solid-state amplifier in a laser cavity, applying a radio-frequency (rf) control signal to an acousto-optic (AO) modulator installed in the laser cavity, to generate a stream of laser output subpulses with a desired pulse width and peak intensity, and selecting the frequency of the rf control signal to ensure that the output subpulses have the desired pulse width and height. The method also includes controlling the step of applying laser pumping energy, to apply constant laser pumping power during each pump macropulse, the duration and timing of which are preselected, and generating a laser output beam in the form of multiple subpulses of selected width and height, during each pumping macropulse. The energy and width of each subpulse are selectively controlled by the rf signal applied to the AO modulator, and the total power delivered by the beam is controlled by the width and duty cycle of the pump macropulses, without the need for feedback control of the modulator.

It will be appreciated from the foregoing that the present invention represents a significant advance in the field of high-power lasers. Specifically, the apparatus of the invention generates a conveniently controllable pulsed laser output that is very well suited for use in drilling and other material processing applications. Independent controls allow for selection of the energy of each subpulse and the selection of the total number of delivered subpulses in each macropulse or the average rate at which pulses are delivered. Other aspects and advantages of the invention will become apparent from the following more detailed description, taken in conjunction with the accompanying drawings.

DESCRIPTION OF THE PREFERRED EMBODIMENT

Figure 1:
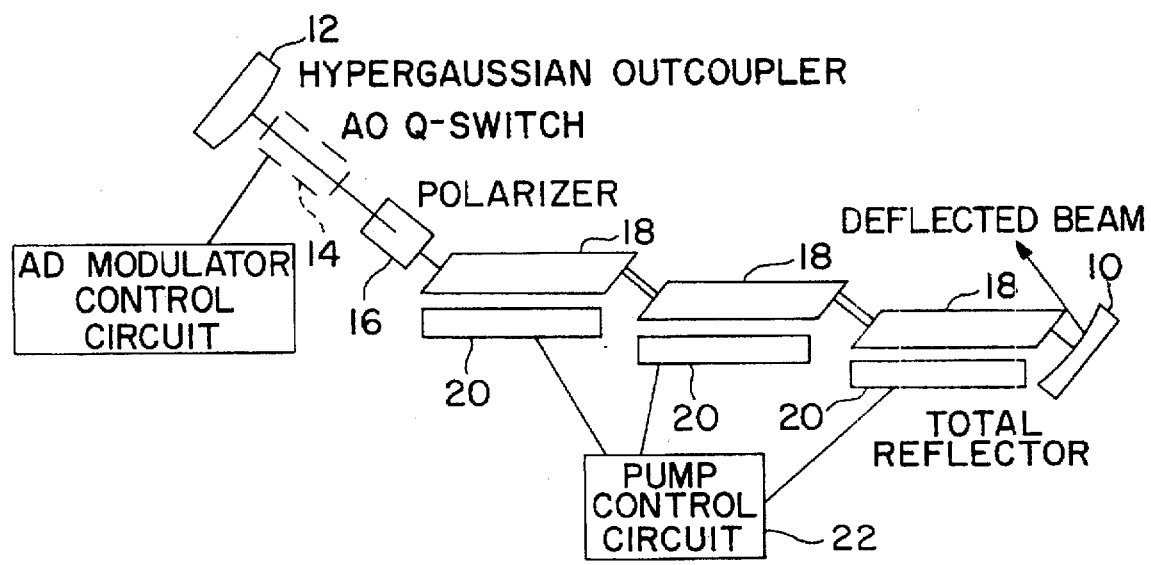
FIG. 1 is a diagrammatic view of a high-power solid-state laser in accordance with the invention.

As shown in the drawings for purposes of illustration, the present invention pertains to an improved technique for controlling the shape and timing of output pulses from a high-power solid-state laser, to provide a laser beam that is well suited for drilling and other machining operations on various materials. When pulsed with laser pumping energy, solid-state lasers provide output in the form of short pulses occurring at a fairly uniform frequency known as the natural relaxation oscillation frequency. For machine tool applications, ideally these output pulses should be of uniform peak intensity, but should be conveniently controllable in terms of the effective energy delivered in the output beam. Prior attempts to achieve this goal have either fallen short in terms of total power output, or have required relatively complex feedback control systems to maintain a desired uniformity of output.

In accordance with the present invention, a solid-state laser provides output pulses of uniform intensity and spacing, and with complete control of effective beam power without the need for complex feedback control systems. The solid-state laser is pumped using laser diodes to provide a practically uniform pump rate over the entire duration of each pump pulse, and subpulses are controlled by an intracavity acousto-optic modulator. As shown by way of example in FIG. 1, the laser of the invention includes a cavity defined by two mirrors: a concave reflector 10 and a convex hypergaussian outcoupler 12. Also included in the cavity is an acousto-optic (AO) modulator 14, a polarizer 16, and one or more solid-state zig-zag amplifiers, three of which are shown at 18. The number of amplifiers 18 employed is a function of the total output power required. The amplifiers 18 are pumped by multiple semiconductor diodes, indicated at 20, controlled by a pump control circuit 22, and the AO modulator 14 is controlled by a modulator control circuit 24.

Figure 3A:
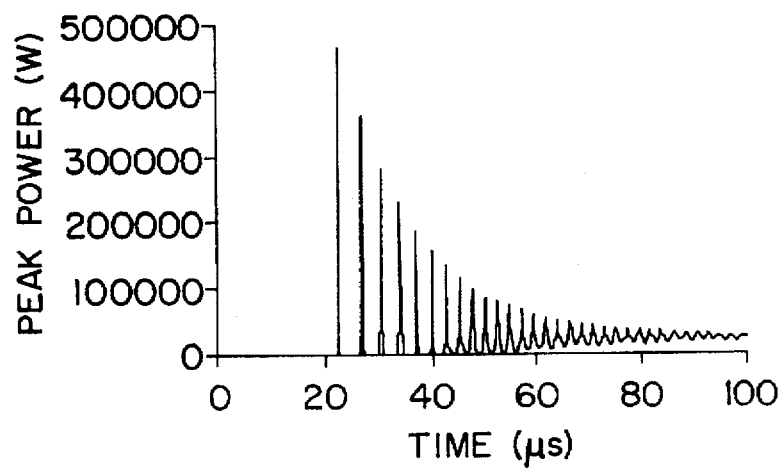
FIG. 3A is graph showing relaxation oscillation laser output from a non-modulated laser.
Figure 3B:
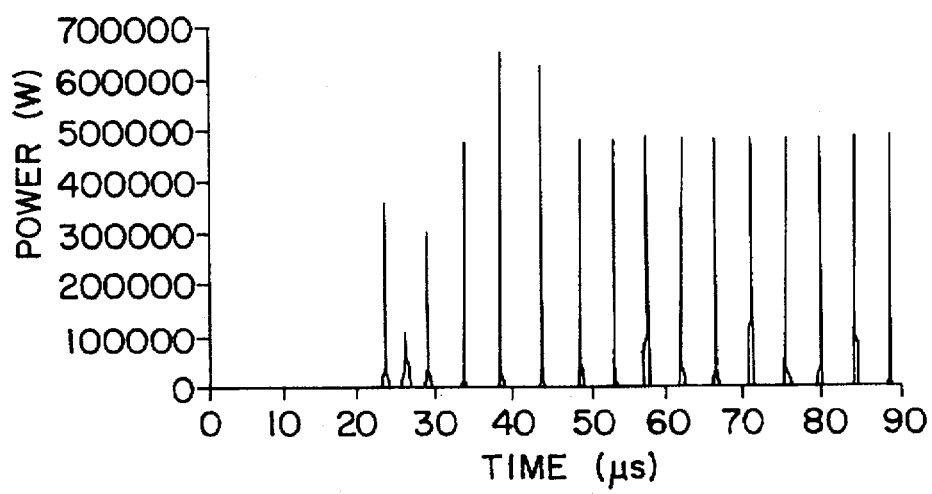
FIG. 3B is a similar graph showing laser output from the laser of the invention modulated to provide a sequence of pulses of uniform peak intensity.

As shown in FIG. 3A, when a solid-state laser is not modulated and is subjected to a brief pumping pulse, it produces a series of uniformly spaced pulses of rapidly decreasing peak intensity, the frequency of the pulses being the natural relaxation oscillation frequency of the laser. The AO modulator 14 is similar to a conventional Q-switch, but differs in some important respects. First, the modulator 14 is modified to operate at high beam powers of multiple kilowatts. Also, the modulator 14 operates at a frequency near the natural relaxation oscillation frequency of the laser and at relatively low modulation depth in the 5–30% range. The pulse width and intensity of the resulting relaxation oscillation pulses are controlled by varying the modulation depth, the modulation frequency, and the duty cycle of the modulator. By operating at a depth of modulation in the 5–30% range, the modulator 14 enables the production of pulses an order of magnitude longer than those obtained by conventional Q-switching of high-power lasers.

The modulator 14 is preferably made of a suitable rugged material, such as fused silica, and can be driven at moderate radio-frequency (rf) power, typically less than 100 W, while modulating kilowatt and multi-kilowatt lasers. The rf power is applied at near the relaxation oscillation frequency (50 kHz to 300 kHz) in a sinusoidal wave, square wave, or other format to produce the desired variable pulse output waveforms.

Figure 4:
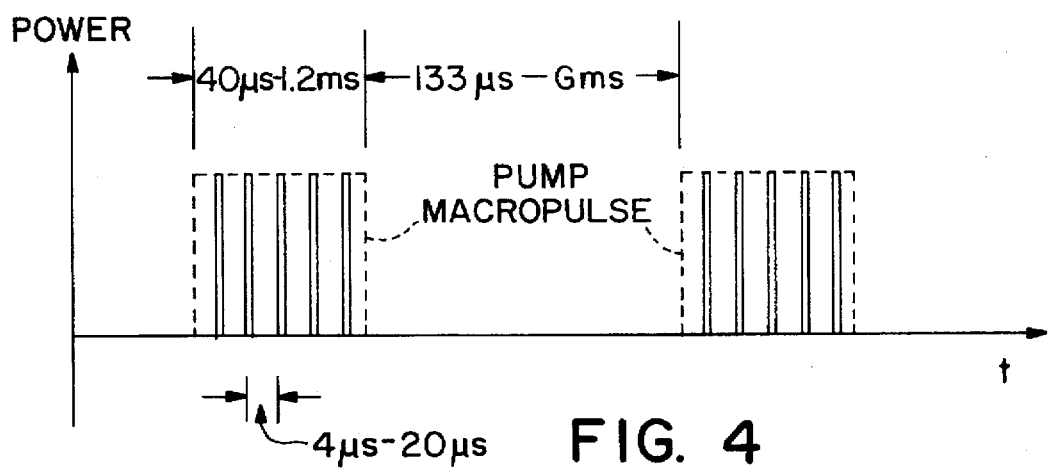
FIG. 4 is a graph showing the output from the laser of the invention over a longer period of time, and showing the relationship between macropulses resulting from the pumping duty cycle and subpulses resulting from relaxation oscillation and intracavity modulation of the laser.

The laser of the invention is also controlled at the pumping level, as best illustrated by the graph of FIG. 4. Use of diode pumping results in a relatively constant pump rate when pumping is enabled. In accordance with one aspect of the invention, the pump pulse length is varied while maintaining the same peak pump rate when pumping is enabled. In other words, the pumping duty cycle can be conveniently varied with a simple adjustment of the pump control circuit.

The pump duty cycle can provide macropulses that vary from very short (including, for example, only one subpulse), to continuous (producing a continuous stream of subpulses or relaxation pulses). One way to use this control in conjunction with the modulator controls, is to first set the modulator 14 to produce output pulses of a desired peak intensity (suitable, for example, for performing a drilling operation at an optimized rate), and then to select the macropulse width to provide the number of subpulses needed to drill through a particular thickness of material being drilled. Each relaxation oscillation subpulse, being of the same height and width, dissipates approximately the same amount of energy in the drilling operation, but the total energy in each macropulse is determined by the selected width of the pumping macropulse.

The following table gives some examples of ranges of macropulse and subpulse parameters that can be used in accordance with the invention:

| Pump Duty Cycle | Macropulse duration (range) | Macropulse frequency (range) | Subpulse width | Subpulse spacing |
| --- | --- | --- | --- | --- |
| 20% | 40 μs to 1.2 ms | 5 kHz to 167 Hz | 200 ns | 4 μs |
| 30% | 40 μs to 1.2 ms | 7.5 kHz to 250 Hz | 200 ns | 4 μs |
| 20% | 40 μs to 1.2 ms | 5 kHz to 167 Hz | 100 ns | 10 μs |

As shown in FIG. 4, varying the macropulse duration and frequency affords convenient control of the number of subpulses per macropulse and the average power delivered to a workpiece to which the laser beam is directed. The ranges given in the above table are exemplary only. The pump pulse length may be varied to provide only one subpulse per macropulse, if desired, or as many as 100 subpulses, or more, per macropulse, with each subpulse having the same height and width.

Figure 2:
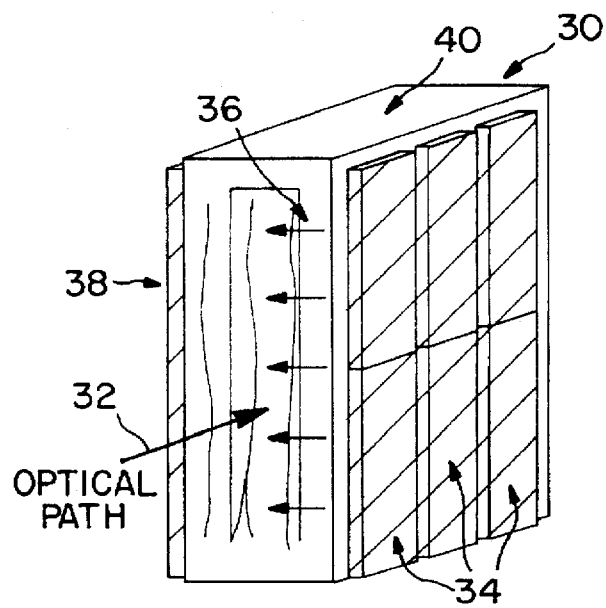
FIG. 2 is a simplified perspective view of an acousto-optic (AO) modulator used in the laser of FIG. 1.

As best shown in FIG. 2, the AO modulator 14 in the illustrative embodiment of the invention is constructed from a slab 30 of fused silica. The dimensions of the modulator will, of course, vary for different implementations, but may be, for example, 12 mm wide by 40 mm high by 45 mm deep. The optical path, indicated by arrow 32, is through an active aperture measuring approximately 7 mm by 30 min. On one face of the slab 30 is an array of rf electro-acoustical transducer elements 34, which may be, for example, of lithium niobate ($LiNbO_3$) material. The transducer elements 34 transmit acoustic waves through the modulator 14, as indicated by the small arrows 36, toward an acoustic absorber 38 mounted on the opposite face of the slab 30. The upper and lower edge faces 40 of the slab 30 are insulated by air.

In operation, the modulator 14 periodically introduces an intracavity loss, which momentarily suppresses lasing. The rf frequency applied to the modulator 14 is chosen to be near, and typically a little less than, the natural frequency of relaxation oscillation of the laser. The relaxation pulses are then basically locked to the frequency of the modulator. In conventional Q-switching, the resultant laser pulses are extremely intense but of very short duration. In the configuration of the invention, the modulator 14 uses a small depth of modulation, around 5–30%, and the resultant pulses are both longer and of lower peak intensity than those produced by conventional Q-switching.

Good beam quality is obtained largely as a result of specific optical design features of the laser, including features of the modulator 14, the hypergaussian output coupler 12 and the polarizer. The modulator 14 is designed to minimize thermal distortion, which would otherwise degrade beam quality at high average power and thereby diminish the usefulness of the modulated laser. The fused silica material of the modulator element 14 is selected to minimize absorption at the laser wavelength. The depth of modulation and the duty cycle of the modulation are both minimized to reduce the rf power input into the modulator element 14. A cooled absorber removes transmitted acoustic waves from the modulator element 14 to further reduce heating due to the rf drive circuit. The rf transducers 34 are cooled to reduce heat transfer from the transducers into the modulator element 14. The top and bottom faces of the modulator element 14 are insulated so that the temperature profile in the modulator remains constant in the vertical direction, thus minimizing thermal distortion in that direction.

Good beam quality is also due, in part, to the use of a resonator having a hypergaussian reflectivity profile on the outcoupler mirror 12. The hypergaussian reflector provides transverse mode control to enable high beam quality to be obtained from the large beam cross section (0.5 cm$^2$ or larger) required for solid state lasers of high powers of one kilowatt or more. The resonator also optimizes modulator performance, which is sensitive to the angle between the direction of the optical beam and the direction of the rf-induced acoustic wave 36 in the modulator 14. Optimum modulator performance minimizes the rf modulation power required, which reduces thermal distortion in the modulator element and improves the output beam quality.

Finally, the polarizer 16 incorporated into the optical cavity is another component that contributes to the high beam quality obtained from the laser of the invention. The polarizer 16 maintains optical polarization perpendicular to the longitudinal acoustic wave vector produced by the rf transducers 34 in the modulator 14. This preferred configuration maximizes the modulation efficiency and minimizes the rf power required to operate the modulator 14, which, in turn, reduces thermal distortion in the modulator and improves the output beam quality. The polarizer 16 is of uncoated fused silica oriented at Brewster's angle to provide sufficient polarization discrimination, while producing minimal thermal distortion in a high average power beam.

The zig-zag amplifiers 18 are preferably designed to handle high output powers, and may be, for example, similar to the zig-zag amplifier described in copending patent application Ser. No. 08/148,758, entitled "High-Brightness Solid-State Laser with Zig-Zag Amplifier," assigned to the same assignee as the present application, now U.S. Pat. No. 5,555,254.

It will be appreciated from the foregoing that the present invention represents a significant advance in the field of high-power solid-state lasers for use in applications such as material processing. In particular, the invention provides a pulsed output beam having subpulses of uniform width and peak intensity, which can be varied by control of an acousto-optic modulator, and wherein the number and frequency of the output subpulses can be conveniently controlled by varying the length and duty cycle of laser pumping macropulses. Thus, the subpulse height can be selected to optimize the rate of a cutting or drilling operation, and the number of subpulses delivered can be adjusted to match other parameters of the operation, such as the thickness of the material. Furthermore, the invention provides a laser beam of high average power, ranging from hundreds of watts to several kilowatts, while maintaining beam quality of 1.5 to 3.0 times diffraction limited. Features that combine to maintain the beam quality include the zig-zag amplifier 18, the use of diode pumping, the provision of a large aperture modulator element designed to minimize thermal distortion while transmitting several kilowatts of average power, and the provision of a large aperture polarizer.

It will also be appreciated that, although a specific embodiment of the invention has been described for purposes of illustration, various modifications may be made without departing from the spirit and scope of the invention. Accordingly, the invention should not be limited except as by the appended claims.

We claim:

1. A high-power solid-state laser suitable for material processing applications, comprising:

a laser cavity defined by two reflectors;

at least one solid-state amplifier disposed in the laser cavity;

at least one array of diodes located adjacent to the at least one amplifier, for pumping the laser during pump macropulses, in accordance with a selected duty cycle;

an acousto-optic (AO) modulator disposed in the laser cavity;

a signal source operating at radio-frequency (rf) coupled to the AO modulator to produce a series of laser output pulses of constant pulse width and height during each pump macropulse, wherein the signal source provides modulator control signals having a frequency determined by the natural relaxation oscillation frequency of the laser, a relatively low peak amplitude corresponding to a low depth of modulation and low signal power needed at the natural relaxation oscillation frequency, and a smaller duty cycle than would be needed for hard Q-switching of the laser; and a control circuit for switching the pump diodes on and off in a series of macropulses of preselected duration and frequency, wherein the duration and frequency of the pumping macropulses determine the number and total energy of pulses emitted from the laser, without the need for feedback control of the modulator.

2. A high-power solid-state laser as defined in claim 1, wherein:

the laser output pulses have a length in the range of approximately 100 ns to 300 ns (nanoseconds) and a spacing derived from the natural relaxation oscillation frequency of the laser.

3. A high-power solid-state laser as defined in claim 1, wherein:

there are at least two solid-state amplifiers of the zig-zag type in series, to provide a total average output power in excess of one kilowatt.

4. A high-power solid-state laser as defined in claim 1, wherein:

the signal source provides an AO modulator control signal having a depth of modulation in the range of approximately 5–30%.

5. A high-power solid-state laser as defined in claim 1, wherein:

the signal source provides an AO modulator control signal having a duty cycle of approximately 50% or less.

6. A method for operating a high-power solid-state laser to provide a conveniently controllable output beam of high beam quality, the method comprising the steps of:

applying laser pumping .energy to at least one solid-state amplifier in a laser cavity;

applying a radio-frequency (rf) control signal to an acousto-optic (AO) modulator installed in the laser cavity, to generate a stream of laser output subpulses with a desired pulse width and peak intensity;

selecting the frequency of the rf control signal to ensure that the output subpulses have the desired pulse width and height, wherein the frequency is selected to be close to the natural relaxation oscillation frequency of the laser cavity;

selecting a peak amplitude of the rf control signal to provide a low depth of modulation and, therefore, a low control signal power relative to that needed for hard Q-switching;

selecting a low duty cycle and, therefore, a low average power, for the rf control signal relative to that needed for hard Q-switching;

controlling the step of applying laser pumping energy, to pump the laser only during pump macropulses, the duration and timing of which are preselected; and generating a laser output beam in the form of multiple subpulses of selected width and height, during each pumping macropulse;

whereby the energy of each subpulse is selectively controlled by the rf signal applied to the AO modulator, and the average power delivered by the beam is controlled by the width and duty cycle of the pump macropulses, without the need for feedback control of the modulator.

7. A method as defined in claim 6, wherein:

the step of selecting a peak amplitude for the rf control signal provides a modulation depth in the range of approximately 5–30%.

8. A method as defined in claim 6, wherein:

the step of selecting a duty cycle for the rf control signal provides a duty cycle of approximately 50% or less.

* * * * *